(12) United States Patent
Nijboer et al.

(10) Patent No.: US 7,773,482 B2
(45) Date of Patent: *Aug. 10, 2010

(54) OPTICAL RECORD CARRIER CONTAINING SPECIAL CODES

(75) Inventors: Jakob Gerrit Nijboer, Eindhoven (NL); Johannes Gerardus Fredericus Kablau, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1189 days.

This patent is subject to a terminal disclaimer.

(21) Appl. No.: 11/176,639

(22) Filed: Jul. 7, 2005

(65) Prior Publication Data

US 2005/0254797 A1    Nov. 17, 2005

Related U.S. Application Data

(63) Continuation of application No. 10/014,186, filed on Dec. 11, 2001, now Pat. No. 6,952,388.

(30) Foreign Application Priority Data

Dec. 11, 2000  (EP)  .................................. 00204415
Mar. 28, 2001  (EP)  .................................. 01201194

(51) Int. Cl.
*G11B 20/12*  (2006.01)
*G11B 7/00*  (2006.01)

(52) U.S. Cl. ............... 369/59.23; 369/59.25; 369/47.27; 369/275.3

(58) Field of Classification Search ............. 369/59.23, 369/59.25, 275.3, 47.22, 47.27
See application file for complete search history.

(56) References Cited

U.S. PATENT DOCUMENTS

| 5,289,450 | A | * | 2/1994 | Mizumoto et al. | ........ 369/53.37 |
| 5,418,764 | A | * | 5/1995 | Roth et al. | ............... 369/30.04 |
| 5,607,188 | A | | 3/1997 | Bahns et al. | |
| 5,706,271 | A | * | 1/1998 | Hashimoto | ............... 369/53.37 |
| 5,761,301 | A | | 6/1998 | Oshima et al. | |
| 5,835,462 | A | * | 11/1998 | Mimnagh | ................. 369/47.39 |
| 5,898,655 | A | * | 4/1999 | Takahashi | ................. 369/47.53 |
| 6,115,353 | A | | 9/2000 | Horie et al. | |
| 6,137,769 | A | * | 10/2000 | Sawada et al. | ........... 369/275.3 |

(Continued)

FOREIGN PATENT DOCUMENTS

EP    0265984 A1    5/1987

(Continued)

OTHER PUBLICATIONS

Bratt et al, "Principles of Optical Disc Systems", Adam Hilgar LTD, Bristol and Boston, 1985, pp. 210-227.

*Primary Examiner*—Thang V Tran
*Assistant Examiner*—Adam R Giesy

(57) ABSTRACT

A record carrier of a disc-like optically inscribable type, has a preformed track in which an auxiliary signal including a sequence of codes recorded by a preformed track modulation. The codes include a sequence of address codes specifying the addresses of the track portions in which the address codes are recorded and special codes. The special codes can be distinguished from the address codes and specify control data for controlling a recording by a recording device. The record carrier is provided with an extended area preceding a program calibration area. The extended area includes special codes representing additional control information for controlling the recording.

26 Claims, 8 Drawing Sheets

U.S. PATENT DOCUMENTS

| | | |
|---|---|---|
| 6,205,249 B1 | 3/2001 | Moskowitz |
| 6,249,499 B1 * | 6/2001 | Andoh .................... 369/53.22 |
| 6,404,712 B1 * | 6/2002 | Lee et al. ................. 369/47.53 |
| 6,411,574 B1 * | 6/2002 | Su et al. .................. 369/47.11 |
| 6,643,238 B2 * | 11/2003 | Nakajima ................ 369/53.22 |
| 6,704,263 B1 * | 3/2004 | Nijboer et al. ........... 369/59.21 |
| 6,952,388 B2 * | 10/2005 | Nijboer et al. ........... 369/59.25 |

FOREIGN PATENT DOCUMENTS

| | | |
|---|---|---|
| EP | 0325330 A2 | 7/1989 |
| EP | 0342748 A1 | 11/1989 |
| EP | 0397238 A1 | 11/1990 |
| EP | 0426872 A1 | 5/1991 |
| NL | 1011168 | 8/1999 |

\* cited by examiner

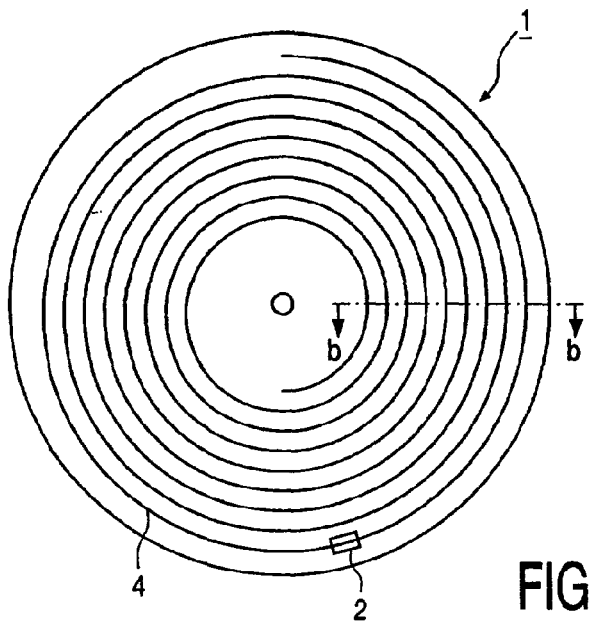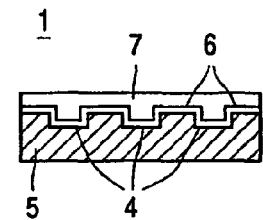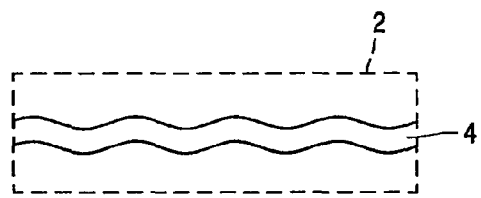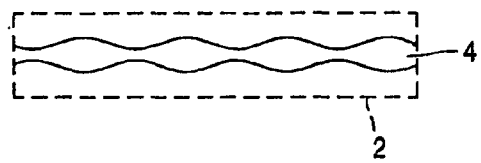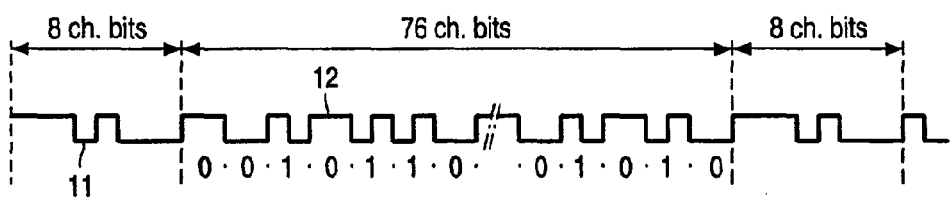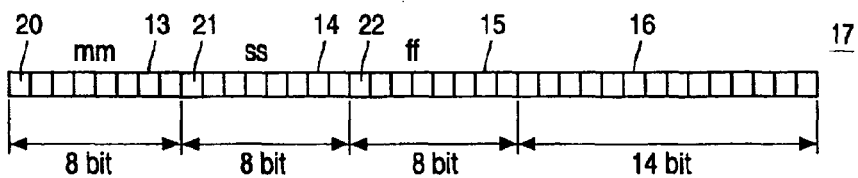

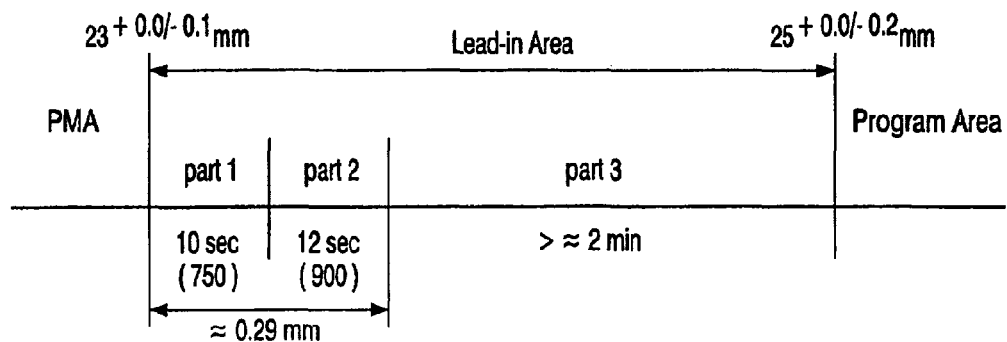

Lead-in Area part 1:

Special Info 1
9x normal Timecode
Special Info 2
9x normal Timecode
Special Info 3
9x normal Timecode
repeat sequence
( 25 repeats of 30 frames )

( first Special Info 1 at
Start time of Lead-in + 00:00:09

Lead-in Area part 2:

Special Info 1
9x normal Timecode
Special Info 2
9x normal Timecode
Special Info 3
9x normal Timecode
Additional Info 1
9x normal Timecode
Additional Info 2
9x normal Timecode
Additional Info 3
9x normal Timecode
repeat sequence
( 15 repeats of 60 frames )

Lead-in Area part 3:

Special Info 1
9x normal Timecode
Special Info 2
9x normal Timecode
Special Info 3
9x normal Timecode
repeat sequence All Sequences in part 1, 2 and 3 shall be connected without interruptions.

FIG. 13

OPTICAL RECORD CARRIER CONTAINING SPECIAL CODES

CROSS-REFERENCE TO RELATED APPLICATIONS

This is a continuation of U.S. Ser. No. 10/014,186, filed Dec. 11, 2001 now U.S. Pat. No. 6,952,388, by Jakob Gerrit Nijboer, et al., and entitled, RECORD CARRIER OF THE OPTICAL TYPE AND A DEVICE FOR RECORDING AND/OR PLAYBACK FOR USE WITH SUCH RECORD CARRIER.

FIELD OF THE INVENTION

The invention relates to a record carrier and a device for recording to and/or playback of the record carrier.

BACKGROUND OF THE INVENTION

Such a record carrier and device are known from the European Patent EP 0 397 238. The special codes therein comprise special information containing for instance control information for recording, such as write power, location of special areas on the record carrier, a reference recording speed, disc application codes, disc type and so on. This has been applied in products commonly known under the name of recordable Compact Disc or CD-R. In practice the amount of information to be stored in the special codes proves to be limited. To solve this, the definition of the special codes could be changed in order to be able to increase the capacity of information to be stored therein. However, this will result in incompatibility with existing systems and standards present on the market.

OBJECT AND SUMMARY OF THE INVENTION

In consequence, amongst other things, it is an object of the invention to increase the amount of control information to be stored in the special codes without changing the definition of the special codes. According to one of aspects, a record carrier includes an extended area (XAA).

This extended area (XAA) may be used to record additional control information in the special codes (SC). By locating this extended area outside the known areas, legacy recording devices already present in the market will not be distracted by this extended area, as this extended area (XAA) is outside usual regions for such devices. However, only new recording devices, with for example increased recording speed capabilities, may be adapted to handle the control information recorded in the extended area. By locating this extended area adjacent the program calibration area (PCA) a recording device will have no major difficulties to move its reading means above this extended area. Further, as normally a recording device will start looking for control information in the lead-in area (LI), a subsequent jump to the extended area (XAA) will not require large access times.

An advantageous embodiment is obtained by having a buffer area located between the extended information area (XAA) and the program calibration area (PCA) containing only address codes (AC). The buffer area that may protect existing drives against slipping into an area with contents that they do not know.

A preferred embodiment is obtained by having a buffer area that covers a range of absolute playback time (ATIP) of between 1 and 2 seconds. The buffer area should be as small as possible in order to keep the end radius of the extended area (XAA) as large as possible.

A next embodiment is obtained by having the extended information area (XAA) precedes the start of the lead-in area (LI) by approximately 1 minute absolute playback time (ATIP). This limits the inner displacement of reading means of a recording device to such an extent that the displacement falls in a mechanical allowed range.

A further advantageous embodiment is obtained by having a periodic pattern of address codes and special codes where the pattern in the lead-in area (LI) has a predetermined positional relationship with respect to a predetermined reference address. Such a predetermined positional relationship can be used to indicate the presence of the extended area (XAA). A recording device adapted to handle information of the extended area, will then, after starting with reading the information in lead-in area, continue reading in the extended area.

An advantageous embodiment of a record carrier is obtained by having the predetermined reference address be the start address or end address of the lead-in area (LI). The start address or end address may be specified in the special information which can be read in advance. This provides a unique reference for each disc witch can be used to define a positional relationship.

A further advantageous embodiment of a record carrier is obtained by shifting periodic pattern is by a predetermined number of address codes (AC) with respect to the predetermined reference address. Such a shift is relatively easy to establish by comparing address codes.

A device for recording and/or playback according to the invention obtained by a device that is able to detect the presence of a record carrier provided with such additional control information and consequently using this information.

A further advantageous embodiment is obtained by shifting the periodic pattern by a predetermined number of address codes (AC) with respect to the predetermined reference address. Only in case the predetermined positional relationship is being detected, a jump of appropriate reading means across the record carrier is being performed. The device does need to perform such a time consuming jump if there is no need for, such as for instance in case of a record carrier without the additional information. Then there will be no performance loss in case of handling such discs.

BRIEF DESCRIPTION OF THE DRAWINGS

These and further aspects and advantages of the invention will be discussed in more detail hereinafter with reference to the disclosure of preferred embodiments, and in particular with reference to the appended Figures that show:

FIG. 1 a record carrier provided with a servo-track which exhibits a track modulation;

FIG. 2 illustrates a suitable format for an auxiliary signal which is recorded in the servo track by means of track modulation;

FIG. 3 gives a code word represented by the auxiliary signal;

FIG. 13 shows a fifth embodiment of the invention comprising allocation of the additional control information mixed in the Lead-in area.

DESCRIPTION OF THE EMBODIMENTS

Figure 4:
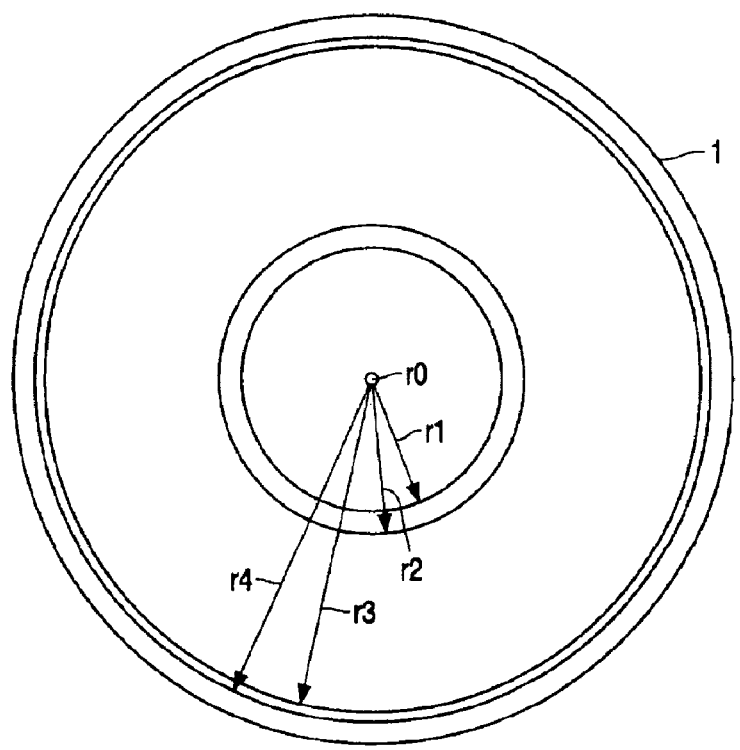
FIG. 4 shows the lay-out of a record carrier.

FIG. 1 shows possible embodiments of a record carrier 1 of an inscribable type as described, for example, in the European Patent EP 0 325 330 (PHN 12.399). FIG. 1a is a plan view. FIG. 1b shows a small part of a sectional view taken on the line b-b. FIGS. 1c and 1d are highly enlarged plan views of a part 2 of a first embodiment and a second embodiment of the record carrier 1. The record carrier 1 has a track 4, constituted for example by a preformed groove or ridge. The track 4 is intended for recording an information signal. For the purpose of recording the record carrier 1 has been provided with a recording layer 6 deposited on a transparent substrate 5 and coated with a protective layer 7. The recording layer 6 is of a material which, when exposed to suitable radiation of adequate intensity, is subjected to an optically detectable change. Such a layer may be, for example, a thin layer of a metal such as tellurium. By exposure to laser radiation of suitable intensity this metal layer can be melted locally, so that at this location said layer will have a different reflection coefficient. When the track 4 is scanned by a radiation beam whose intensity is modulated in conformity with the information to be recorded an information pattern of optically detectable recording marks is obtained, which pattern is representative of the information.

The layer may alternatively consist of other radiation—sensitive materials, for example magneto-optic materials, a dye, or materials which upon heating are subjected to a structural change, for example from amorphous to crystalline or vice versa. A survey of such materials is given in the book "Principles of optical disc systems", Adam Hilgar Ltd., Bristol and Boston, pp. 210-227.

The track 4 enables a radiation beam which is aimed at the record carrier 1 for the purpose of recording the information to be positioned accurately on the track 4, in other words it enables the position of the radiation beam in a radial direction to be controlled via a tracking system employing the radiation reflected from the record carrier 1. The measurement system for measuring the radial position of the radiation spot on the record carrier may correspond to one of the systems as described in the above mentioned book "Principles of optical disc systems".

The auxiliary signal is recorded in the track 4 by means of a preformed track modulation, suitably in the form of a sinusoidal track excursion as shown in FIG. 1c. However, other track modulations such as for example track width modulation (FIG. 1d) are also suitable. Since a track excursion is very easy to realise in the manufacture of the record carrier it is preferred to use a track modulation in the form of such a track excursion.

It is to be noted that FIG. 1 shows the track modulation to a highly exaggerated scale. In reality it is found that in the case of a track width of approximately $10^{-6}$ meters an excursion having an amplitude of approximately $30.10^{-9}$ meters is adequate for a reliable detection of the scanning beam modulation. An excursion of small amplitude has the advantage that the distance between adjacent servo tracks can be small. FIG. 1 also shows the track pitch (the spacing between the track centres) to a substantially larger scale than in reality. In practice the track pitch is approximately $1.6 \cdot 10^{-6}$ meters.

An attractive track modulation is that in which the frequency of the track modulation is modulated in conformity with the auxiliary signal. However, other track modulations are also possible.

FIG. 2 gives an example of a suitable auxiliary signal comprising code signals 12 which alternate with synchronising signals 11. Each code signal 12 may comprise a "biphase-mark" modulated signal having a length of 76 channel bits, which signal is representative of a code word comprising 38 code bits. In the case of a "biphase-mark" modulated signal each code bit is represented by two successive channel bits. A code bit of a first logic value, in the present example "0", is represented by two bits of the same logic value. The other logic value ("1") is represented by two channel bits of different logic values. Moreover, the logic value of the "biphase-mark" modulated signal changes after every pair of channel bits (see FIG. 2), so that the maximum number of successive bits of the same logic value is two at the most. The synchronising signals 11 are selected in such a way that they can be distinguished from the code signals 12. This is achieved when the maximum number of successive bits of the same logic value in the synchronising signals 11 is selected to be three.

FIG. 3 shows a suitable format of 38-bit code words 17 represented by the code signals 12. The code word 17 shown therein comprises three bytes 13, 14 and 15 of 8 bits each and a 14 bit group 16. The most significant bits of the bytes 13, 14 and 15 bear the reference numerals 20, 21 and 22 respectively. The bytes 13, 14 and 15 are used as information bytes and the 14 bit group 16 comprises parity bits for the purpose of error detection. The values represented by the bytes 13, 14 and 15 are referenced mm, ss and ff respectively. Preferably, the 38-bit code words are recorded in the track at equidistant positions and comprise address codes AC and special codes SC which can be distinguished from each other and which are recorded in the track, for example in the sequence illustrated in FIG. 6.

Figure 6:
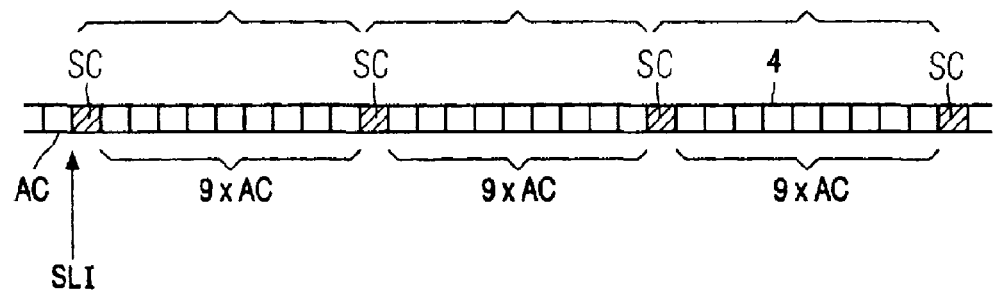
FIG. 6 shows a possible sequence of successive address codes and special codes in the Lead-in area of a record carrier.

In FIG. 6 a constant number, in the present case 9, of address codes AC is always followed by an special code SC. However, it is to be noted that the number of address codes AC between the special codes SC may also be variable instead of constant. The address codes may comprise for example a time code, indicating the time required, when the track 4 is scanned at the nominal scanning speed, to bridge the distance between a reference position in the track and the location where the address code is recorded. Preferably the selected address code is a time code identical to the absolute time code as included in the subcode Q-channel during recording of a CD signal. In that case the value mm specifies a number of minutes and the values ss and ff denote a number of seconds and a number of frames respectively, the specified number of seconds varying between 0 and 59 and the specified number of frames varying between 0 and 74. The number of minutes, seconds and frames may for example BCD encoded in the bytes 13, 14 and 15.

The advantage of the address code described above becomes apparent in particular in the case that a CD signal is to be recorded on the record carrier. In that case the absolute time code to be included in the subcode Q-channel can be derived directly from the address code being read, as is described in detail in the European Patent EP 0 325 330 (PHN 12.399).

When a standard CD signal is recorded three different areas can be distinguished on the record carrier, as is illustrated in FIG. 4, namely:
1) a program area situated between the radial positions bounded by the radii r2 and r3. In this area the data signals are recorded;
2) a Lead-in area situated between the radial positions bounded by the radii r1 and r2. This area comprises a Lead-in track in which the addresses of the different data signals in the program area are stored in the form of a table of contents, as is described, for example, in Nederlands Patent Application NL-A-8900766 (PHN 12.887).
3) a Lead-out area situated between the radial positions bounded by the radii r3 and r4. This area comprises a lead-out track in which a lead-out signal which can be distinguished from the data signals is recorded to mark the end of the program area.

The radial positions of the beginning of the Lead-in area and the beginning of the program area are prescribed by the CD standard, the required distance from the beginning of the lead in area to the centre of rotation r0 being 23 mm, while the distance from the beginning of the program area to the centre of rotation r0 should be 25 mm. Moreover, the lead-out area is required to begin before a predetermined radial position.

For an optimum use of the address code recorded by means of the track modulation it is desirable that the values of the address codes recorded in the track vary identically to the absolute time code in the CD signal to be recorded. This means that the value of the address code in the track portion whose the radial position is indicated by r2 is 00:00:00. Preferably the value of the address code in the Lead-in area increases to a value 99:59:74 at the end of this area. This has the advantage that the value 00:00:00 of the first address code in the program area directly follows the value 99:59:74 of the last address code in the lead-in area.

As already stated, it should be possible for the special codes and the address codes to be distinguished from one another. This can be achieved, for example, if the code signals representing the address codes and the code signals representing the special codes are preceded by different synchronisating signals 11. A number of different synchronisation signals 11 which may be used in conjunction with the code signals 12 described herein are described inter alia in the European Patent No EP 0 342 748 (PHN 12.571).

However, the special codes can also be distinguished from the address codes if the special code contains specific bit combinations in which do not occur in the address code. If the time codes described above are used for the address codes, this is possible by means of a bit combination comprising the most significant bits 20, 21 and 22 for the three bytes 12, 14 and 15, which will be explained with reference to FIG. 5.

Figure 5:
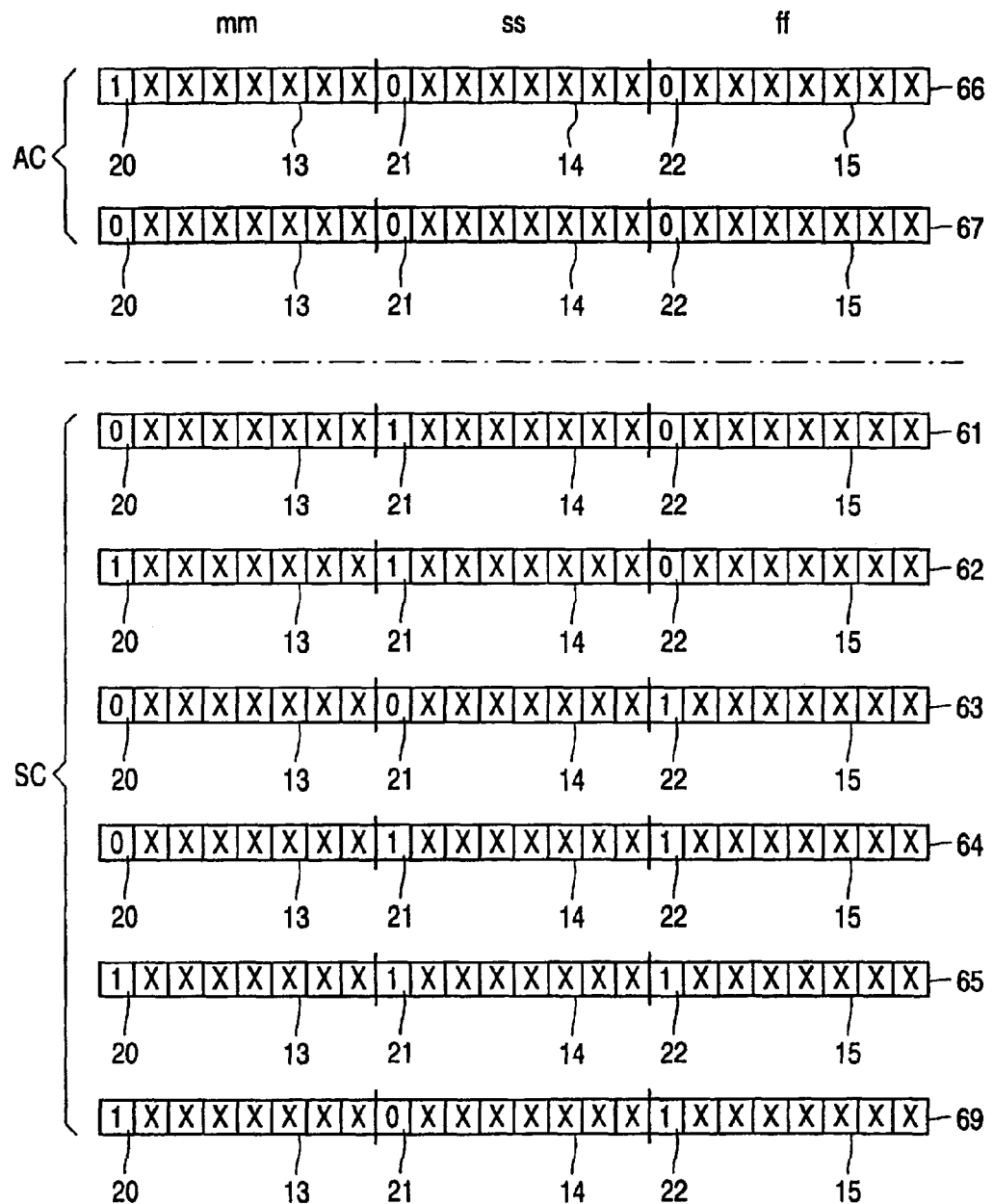
FIG. 5 gives a number of bit combinations used in the auxiliary codes and address codes.

In FIG. 5 the reference numeral 66 denotes the possible bit combination of the address codes in the Lead-in area. On account of the high value mm of the byte 13 in the Lead-in area the most significant bit 20 of the byte 13 in this area will always have the logic value 1. The value ss of the byte 14 varies between 0 and 59, which in the case of the BCD encoding means that the most significant bit 21 of the byte 14 always has the logic value 0. The value ff of the byte 15 varies between 0 and 74, so that the most significant bit 22 for the byte 15 also always has the logic value 0. The other bits of the bytes 13, 14 and 15 in the bit combination 66 may assume either the logic value 0 or the logic value 1, which is indicated by the symbol "x".

The reference numeral 67 denotes the possible bit combinations of the bytes 13, 14 and 15 of the address code in the track portion situated outside the Lead-in area. For the same reasons as in the case of the address code in the lead in area the most significant bits 21 and 22 of the bytes 14 and 15 in the bit combination 67 always have the logic value 0. Moreover, on account of the limited playing time of the record carriers address codes having a value for which the most significant bit 20 in the bit combination 67 assumes the value 1 do not occur in the program area.

The reference numerals 61, 62, 63, 64, 65 and 69 represent a number of bit combinations for which the combination of the most significant bits 20, 21 and 22 of the bytes 13, 14 and 15 differ from the corresponding bit combinations in the address codes. Therefore the bit combinations may be used for the special codes SC, in which case the seven least significant bits of the bytes 13, 14 and 15 can represent additional information. For example the bit combinations 61 can be employed to represent the address code of the Lead-out area. Since the most significant bits of the bytes 13, 14 and 15 of the address codes for the Lead-out area always assume the same logic 0 value, the value of the address code for the Lead-out area may be represented completely by the seven least significant bits of the bytes 13, 14 and 15 in the bit combination 61.

Similarly, the value of the address code for the Lead-in area may be represented by the bit combination 62. The bit combinations 63, 64 and 65 can be employed for special codes with which other additional information is recorded in the track, such as for example the write energy required for recording, the type of record carrier, the write strategy etc.

As can be seen from the definition of a special code as disclosed in FIG. 5, a limited number of bits are available for special information. As such a special code may in practice being incorporated in a standard, there is no possibility of storing a larger number bytes, as this would effect compatibility with legacy player/recorders. To deal with this problem, it is possible to use another area of the disc, for instance the Lead-out area. However, it is not advantageous having drives in player/recorders to jump to this area if there is no information there, in case of a legacy disc, because of the time this takes. Therefore, the embodiments according to the invention, solve this problem by indicating in the special codes, without effecting compatibility, either such information or the presence of such information in another area of the disc.

In practice, the start time of the Lead-in area is indicated in such a special code, according to existing standards. The frame of the Lead-in area will be referred to hereinafter to as SLI. A drive can, when starting up, jump somewhere in the Lead-in area and start reading until it recognises special codes. In practice, the discs will start with a special code SC at SLI, a next special code SC at SLI+10 and so on. However, as current standards prescribe such special code must be used cyclic and must be successively be repeated, the start of such a sequence is not being prescribed.

Figure 7:
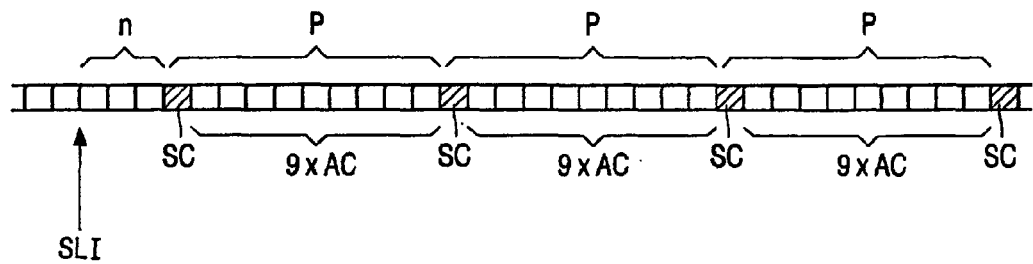
FIG. 7 shows a sequence according to a first embodiment of the invention comprising a shift with respect to the start of the Lead-in area.

To put more information of the disc, for instance to indicate availability of special codes in the Lead-out area, the position of the special codes if shifted for n frames, as illustrated in FIG. 7 showing a first embodiment according to the invention of possible address codes and special codes.

The shift of n frames of a pattern P of one special code SC and nine address codes AC, is defined with respect to the start SLI of the Lead-in area. A drive according to the invention, can calculate n by looking at the differences (in frames) of the found addresses of the special codes SC and the start address SLI of the Lead-in area, the last one being specified in the special codes. Either the amount of such a shift n may indicate additional information to be used by a drive as control information or the the shift may refer to existence of such information elsewhere. This additional information may comprise information with respect to the write strategy of the disc. This may become relevant of high speed discs which require sophisticated approaches to write, the definition of such approaches not being foreseen when defined the format of the special codes.

Even when an existing disc has such a shift n, a drive according to the invention may jump and lose some time, but the system will not fail. There is only a performance problem in such a case. Legacy drives will not be tempered by the shift n. So this legacy drives can write new discs, according to the invention, the old way, due to backwards compatibility of the old disc and old discs can be written on new drives, according to the invention, without delay due to the fact that n=0.

It is noted that instead of defining a shift with respect to the start SLI of the Lead-in area, this may alternatively be done with respect to the end of the Lead-in area or even with respect to the start of the Lead-out area. The shift may thus also being defined backwards.

Figure 8:
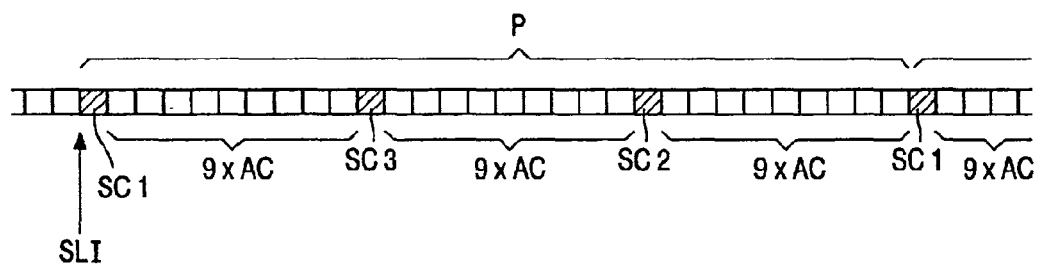
FIG. 8 shows a sequence according to a second embodiment of the invention comprising a specific order of the special codes.

An second embodiment according to the invention is shown in FIG. 8, where a pattern P comprises an ordered sequence of respectively three distinct special codes SC1, SC3, and SC2. These distinct special codes being individually identifiable, as disclosed with reference to FIG. 5, by bits 20, 21 an 22. As the specific order in a pattern P as such is not being prescribed by the current standards, this order can be used to encode additional information or the presence thereof.

Figure 9:
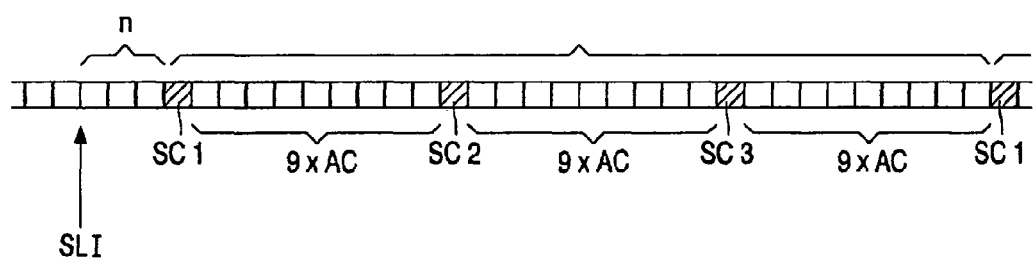
FIG. 9 shows a sequence according to a third embodiment of the invention comprising a shift with respect to start of the Lead-in area.

A third embodiment according to the invention is shown in FIG. 9, disclosing a pattern P of special codes SC1, SC2 and SC3 and address codes AC, the pattern being shifted with n frames. The special codes within in a pattern P may have, or may not have a prescribed order.

As noted before, the additional control information may be stored in the Lead-out area. However, further advantageous embodiments of the invention are obtained by storing the additional control information in either an extended area of the Lead-in area or either mixed in the Lead-in area. These embodiments having the advantage of not needing to jump to the Lead-out area, which jump increases access time. It is noted that storing additional control information in the Lead-in area in the indicated manner may be indicated by including a phase jump or a special order as disclosed before. However, such an indication of the presence of such information may also be omitted as the disadavantage of a jump to a Lead-in area is not present in these embodiments.

Figure 12:
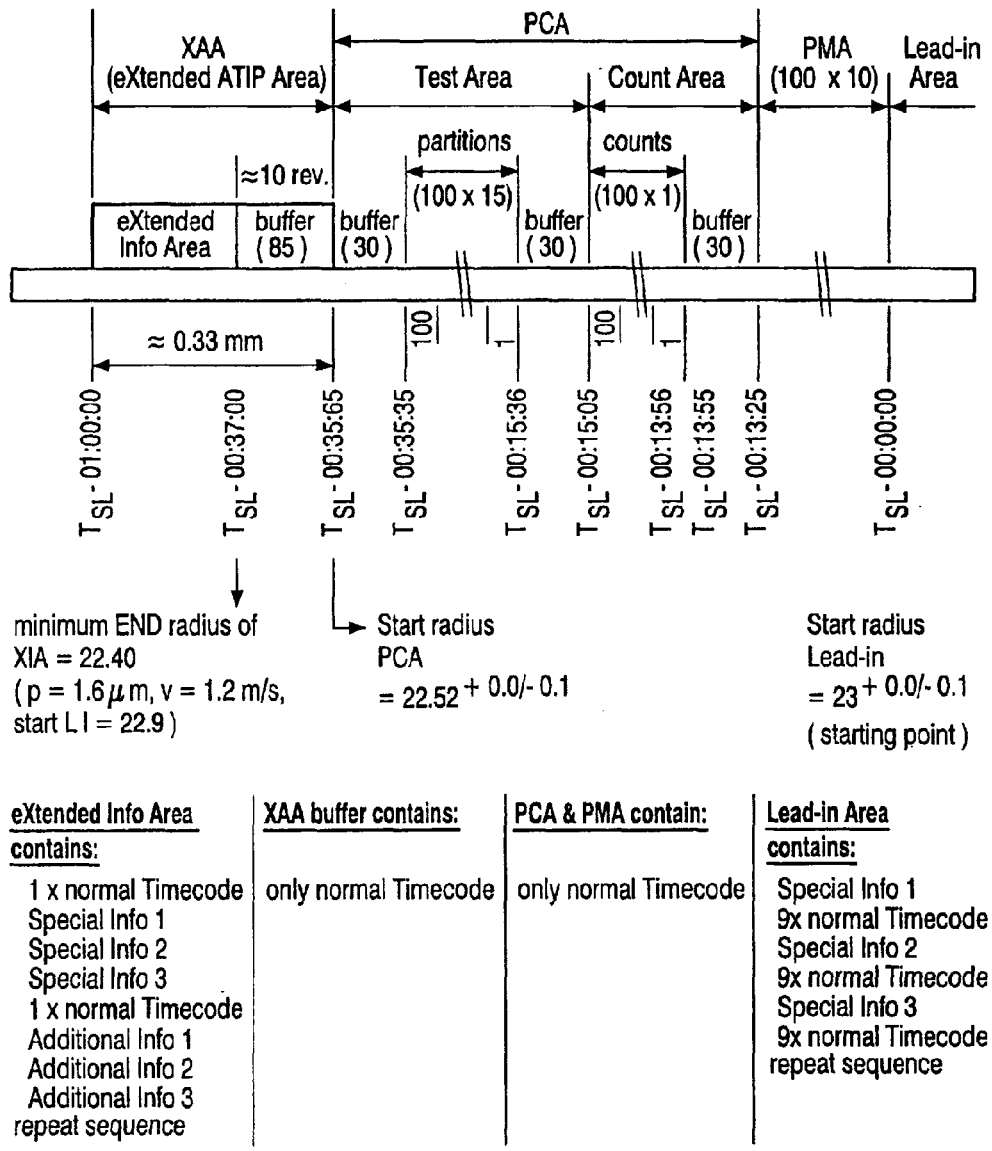
FIG. 12 shows a fourth embodiment of the invention comprising allocation of the additional control information in an extended area of the Lead-in area.

FIG. 12 shows a fourth embodiment according to the invention, comprising storing the additional control information in an extended area near the Lead-in area. This will be referrred to as an extended ATIP area. To avoid compatibility problems with existing lower speed drives, any of the existing areas should be avoided. This also applies to the buffer area in the Program Calibration Area (PCA), which are needed for access. The idea is to extend the grooved area towards the inside of the disc, and fill this additional area with Special Info and Additional Info, except for an additional buffer with timecode only. This buffer area has to protect existing drives against slipping into an area with contents that they do not know, however the buffer shall be as small as possible, to keep the end radius of the eXtended Info Area (XIA) as large as possible. The advantage being that that there is no backwards compatibility as the Extended ATIP Area (XAA) is outside usual regions for "old" players. Further the "old" players will treat the discs according to the invention as the "old" discs. A further advantage of this embodiment is the very fast ATIP Info access for "new" players. Because of ATIP Info "phase offset" in Lead-in Area, a player can detect a disc according to the invention within 10 frames (average 5) and jump to XAA to read full ATIP Info (only 8 frames). These and other details of this embodiment are shown in FIG. 12.

A fifth embodiment will be disclosed with reference to FIG. 13. The additional control information in this embodiment is mixed in the Lead-in area. It is assumed that most players will start reading ATIP info in the second 'half' of the Lead-in area. In this case the Lead-in area is part 1 is to act as a protection buffer for access of the PMA Area, part 2 is to store all Special Info and Additional Info, and part 3 is to be the "compatibility" part of the Lead-in Area. The advantage of the fifth embodiment being that there are no mechanical limitations for the "new" players according to the invention.

Although it is noted that the invention is described with reference to the current standards for CD-recordable or CD-R, this may also be applied to systems with information in a wobble signal, such as CD-rewritable or CD-RW and DVD.

Figure 10:
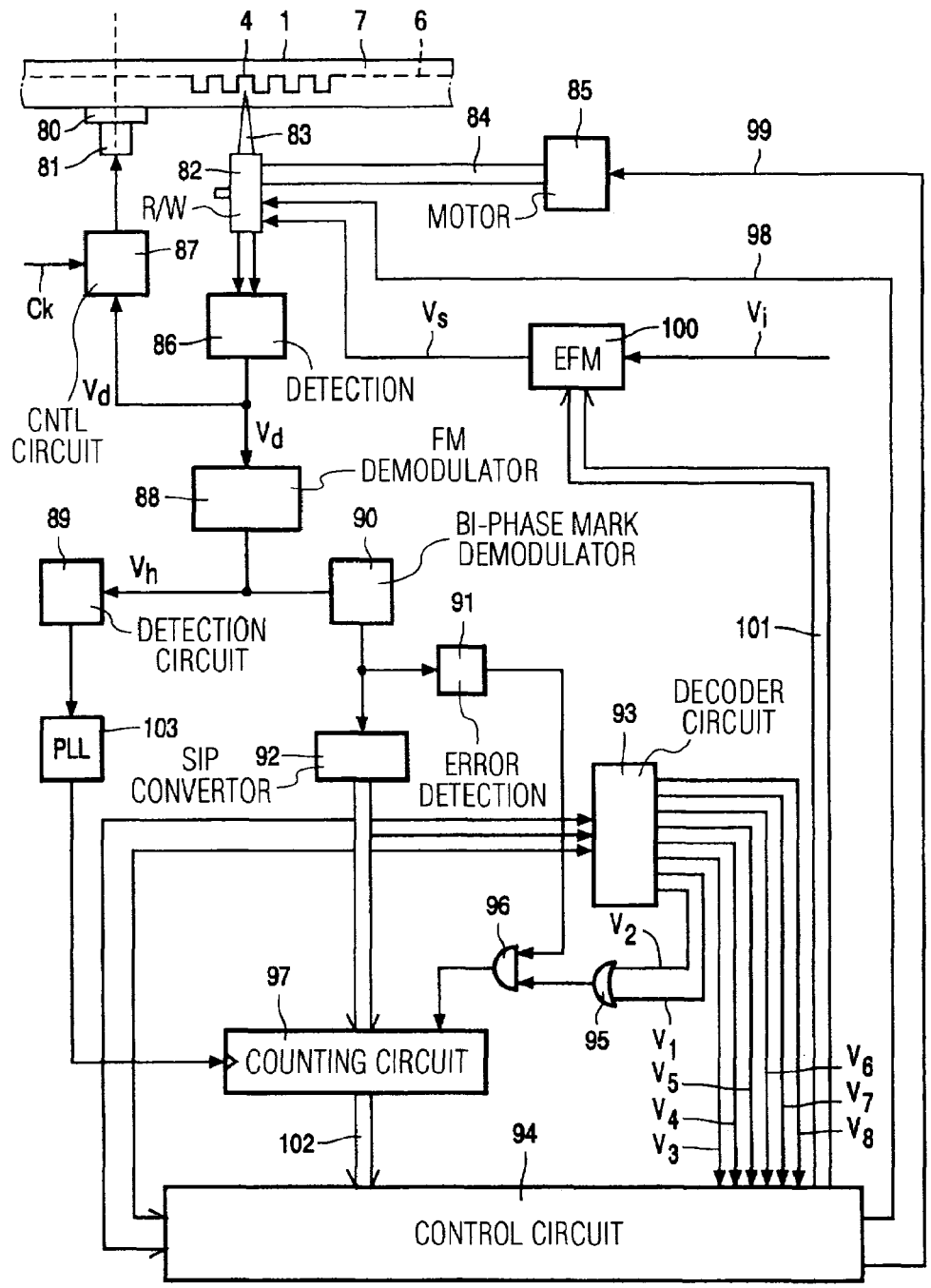
FIG. 10 shows an embodiment of a recording and/or playback device according to the invention.

FIG. 10 shows an embodiment of a recording device for recording data signals Vi on the record carrier 1 described above. The record carrier 1 is placed on a turntable 80, which is rotated by means of a motor 81. An optical write/read head 82 of a customary type is arranged opposite the carrier 1 to read and/or record information from/in the track 4 by means of a radiation beam 83 which is aimed at the recording layer 6. The read head 82 is movable in a radial direction relative to the record carrier 1 by means of a system which comprises, for example, a motor 85 and a spindle 84. The beam 83 is focused on the recording layer 6 in a customary manner and is kept on the track 4 with the aid of customary focusing and tracking systems, not shown. As the track is scanned the beam is modulated in conformity with the preformed track modulation. In the read head 82 the beam which is thus modulated is detected by means of customary radiation-sensitive detectors, which generate signal currents from which a detection signal Vd is derived by means of a detection circuit in a manner as described, for example, in the European Patent EP 0 265 984 (PHN 12.063), frequency of said detection signal corresponding to the frequency of the track modulation. The detection signal Vd is applied to a motor control circuit 87 to control the speed of the motor in such a way that the frequency of the detection signal Vd remains equal to the frequency of a reference clock signal Ck. The motor control circuit 87 may comprise, for example, a phase detector for detecting the phase difference between the detection signal Vd and the reference clock signal Ck, and a power supply circuit for powering the motor with a voltage whose value depends on the phase difference thus detected.

The detection signal Vd is also applied to an FM demodulator 88 to recover the auxiliary signal Vh from the detection signal Vd. The recovered auxiliary signal Vh is applied to a synchronising-signal detection circuit 89 for detecting the synchronising signals 11 in the auxiliary signal Vh and a "biphase-mark" demodulator 90 for converting the auxiliary signals into the 38-bit code words 17. The bits of the 38-bit code words 17 are serially applied to an error-detection circuit 91, which by means of the parity bits of the bit group 16 determines whether the code word is received without errors. Moreover, the serially supplied code words 17 are applied to serial-parallel converter 92, on whose output the bits of the bytes 13, 14 and 15 are available in parallel form. The most significant bits 20, 21 and 22 of the 3 bytes 13, 14 and 15 applied to the outputs of the converter 92 are fed to a customary decoder circuit 93, which generates eight signals V1, V2, V3, V4, V5, V6, V7, V8, the relationship between the signals V1, . . . V8 and the most significant bits 20, 21 and 22 of the bytes 13, 14 and 15 being given in the following Table 1.

TABLE 1

| MSB | 20 | 21 | 22 |
|---|---|---|---|
| V1 | 1 | 0 | 0 |
| V2 | 0 | 0 | 0 |
| V3 | 0 | 1 | 0 |
| V4 | 1 | 1 | 0 |
| V5 | 0 | 0 | 1 |
| V6 | 0 | 1 | 1 |
| V7 | 1 | 1 | 1 |
| V8 | 1 | 0 | 1 |

The signals V3, V4, V5, V6, V7 and V8 are applied to a control circuit 94 for controlling the recording device. The control circuit 94 may comprise a microcomputer of a customary type, which is loaded with suitable control program to be described hereinafter. The signals V1 and V2 on the output of the decoder circuit 93 are applied to a two-input OR gate 95. The signals V1 and V2 indicate that the bytes 13, 14 and 15 on the output of the converter 92 represent an address code within the Lead-in area or an address code outside the Lead-in area, so that the output signal of the OR gate 95 always indicates whether the output signal of the converter 92 concerns address information. The output signal of the OR gate 95 is applied to an input of the two-input AND gate 96. A signal from the error-detection circuit 90, which signal each time indicates by means of a pulse that the received code word 17 is correct, is applied to the other input of the AND gate 96.

Thus, by means of a pulse the AND gate 96 each time indicates whether the information on the output of the converter represents a correctly read address code. The output signal of the AND gate 96 is applied to a parallel load-enable input of a counting circuit 97. The bytes 13, 14 and 15 appearing on the outputs of the converter 92 are applied to the parallel inputs of the counting circuit 97, so that upon every receipt of a correctly read address code the counting circuit 97 is loaded with the address code being read. The counting circuit 97 is of a type which in response to a clock pulse on a clock input of the counter increments the count of the counter by one. A clock signal which is in synchronism with the synchronisation signals 11 being read is applied to said clock input, which clock signal is derived from an output signal of the synchronising signal detection circuit 89 by means of a customary phase locked loop circuit 103.

The counting circuit 97 operates as follows. In response to the clock signal pulses supplied by the phase locked loop circuit 103 the count is each time incremented by one in synchronism with the operation of reading the code values recorded in the track. This means that as soon as the count has a value corresponding to the address codes being read the value of the count will follow the values of the address code being read regardless of whether the subsequent address codes are read incorrectly or the next code word 17 being read does not contain an address code AC but a special code code SC. If at the beginning the count does not correspond to the address code being read the counter is responsive to the next pulse on the output of the AND gate 96 to be loaded with the correct value supplied by the converter 92 via its parallel inputs.

As long as the count correspond to the address code being read the pulses on the output of the AND gate will have no effect because the count then already corresponds to the address code applied to the parallel inputs of the counting circuit. This method of deriving the address codes have the advantage that always an address code corresponding to the position of the track being scanned is available, even in the case that instead of an address code AC an special code SC is recorded in the track. This also means that the track portions in which the address codes are recorded remain addressable. The bytes 13, 14 and 15 on the output of the converter 92 are applied not only to the parallel inputs of the counting circuit 97 but also to the control circuit 94.

The control circuit will use the information in the special codes to control the recording or reading process. Thereto, the control circuit 94 is coupled to the write/read head 82 and the motor 85 via signal lines 98 and 99. The read head can be set to a read mode or a write mode via the signal line 98. In the read mode the intensity of the radiation beam 83 remains at a constant small value, which is too small to bring about the optically detectable change in the recording layer 6. In the write mode the intensity of the radiation beam is switched in accordance with a write signal Vs between a lower intensity level, which does not bring about an optically detectable change, and a high intensity level (also referred to as write energy), which gives rise to an optically detectable change in the recording layer 6, so that an optically detectable pattern corresponding to the write signal Vs is formed in the recording layer 6.

The special code may indicate itself information with respect to this write signal Vs such as nominal writing power, such as customary with current standards. However, additional information with respect to more sophisticated write strategies may be encoded in a manner as described before according to the invention. The control circuit according to the invention may comprise there to circuitry in hardware to detect a shift in the pattern of special codes, the amount of shift and/or the order of special codes within a pattern of address codes and special codes. This may alternatively done by a suitable program loaded in a memory and executed by a processor.

The write signal Vs is generated by an EFM modulation circuit 100, which converts a data signal Vi and the subcode information applied via a bus 101 into an EFM modulated signal in conformity with the CD standard, from which the write signal Vs is derived in a manner as described in detail in, for example, Netherlands Patent Application NL-A-8700934 (PHQ 87.009). Moreover, the high write level (write energy) can be set to a value indicated in the special code.

Figure 11:
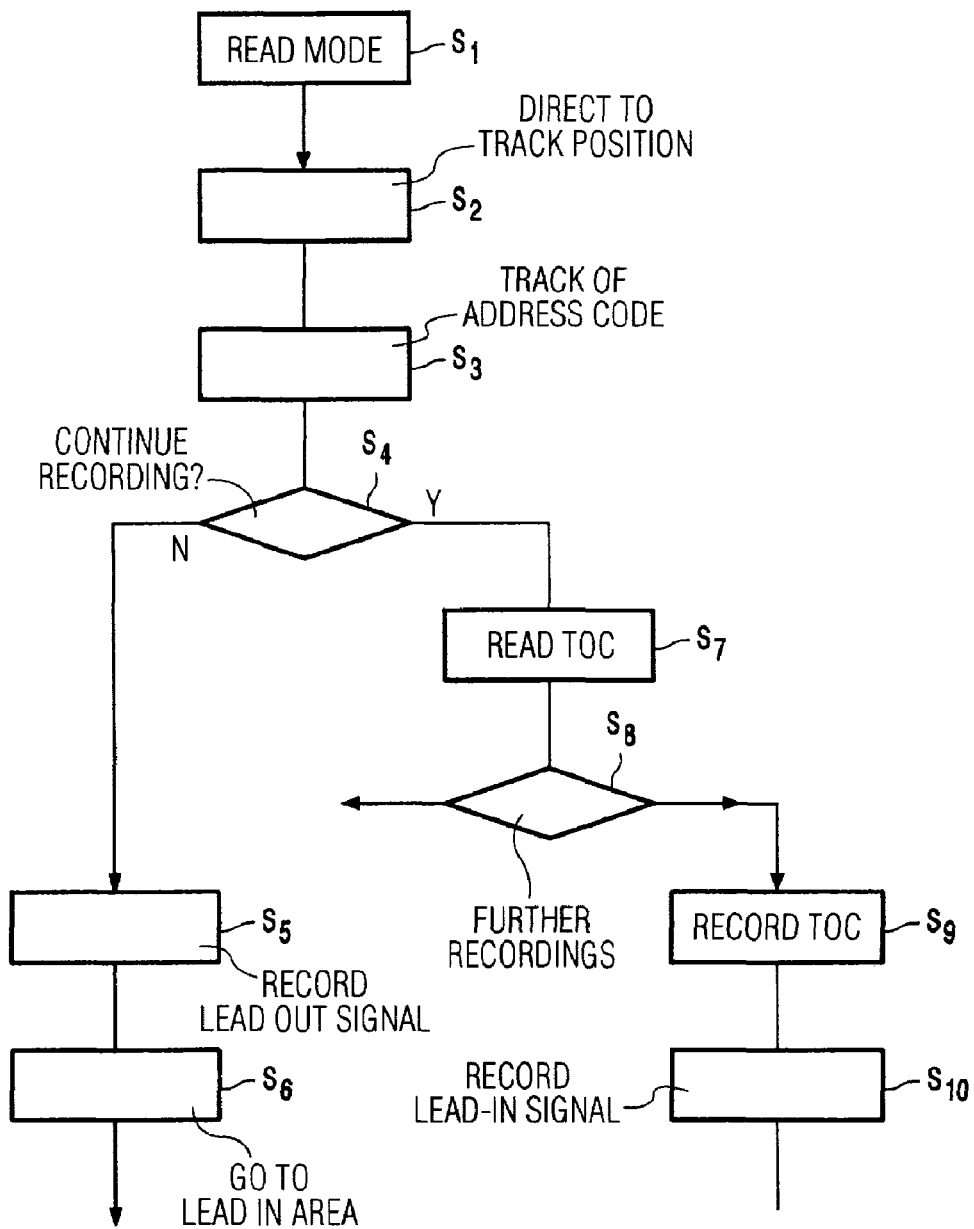
FIG. 11 shows a flow chart of a control program for controlling the process of recording information.

The process of recording information on the record carrier is controlled by the control circuit 94, which for this purpose is loaded with a suitable control program. Such a control program may comprise, for example the steps indicated in the flow chart in FIG. 11.

Step S1 is performed immediately after the record carrier 1 has been loaded into the recording device. In this step S1 the read/write head 82 is set to the read mode and by means of the signals V3 and V4 on the output of the decoder circuit 96 it is ascertained whether the code word supplied to the output of the converter 92 comprises a special code containing the address values of the Lead-in or the Lead-out area. When the presence of theses special codes is detected the values of the Lead-in area and of the Lead-out area are stored in a memory of the control circuit. 94

Subsequently, in step S2, the read/write head 82 is directed towards the track portion containing the address code of the Lead-in area with the aid of the address code being read. Then the presence and content of special codes is being read and stored in the control circuit 94. If not special shift and/or order of special codes within the pattern P of address codes and special codes is being detected, writing continues as described with reference to step S3, using control information presented by the special codes. However, if such a special shift and/or order is being detected, the control circuit 94 may either use this information for controlling purpose of may direct the read/write head 82 to a predetermined location, such as for instance the Lead-out area for reading additional special codes containing additional control information, In step S3 the read/write head 82 is directed towards a track portion by means of the address codes being read. When this track portion is reached the read/write head 82 is set to the write mode, after which the data signal Vi applied to the EFM modulation circuit 100 can be recorded. Recording is terminated once the complete data signal to be recorded has been recorded. Upon termination of the recording process step S4 is performed, in which it is ascertained whether recording has been discontinued as a result of the track portion specified by the start address of the Lead-out being reached. If this is the case, step S5 is performed, in which the lead-out signal is recorded during a predetermined time interval, the subcode information characterizing the lead-out signal being applied to the EFM modulation circuit by the control circuit 94. After recording of the lead-out signal the write/read head 82 is directed towards the lead-in area in step S6 to record the definitive table of contents in the lead-in area.

If during step S4 it is ascertained that recording of the data signal has not been discontinued as a result of the track portion having the address code with the value AVO being reached, the provisional table of contents is recorded in the lead-in area during step 57. Subsequently, it is checked in step S8 whether further data signals are to be recorded on the record carrier. If this is the case the program is terminated. If this is not the case, the definitive table of contents is recorded in the lead-in area in step S9 and the lead out signal is recorded in step S10, after which the program is terminated.

In the foregoing the invention has been illustrated for an optical recording system for recording a standard CD signal on a record carrier comprising substantially concentric tracks. However, it is to be noted that the invention equally applies to the recording of signals in linear tracks. Moreover, the invention may also be applied to the recording of other data signals than CD signals. Neither is the scope of the invention limited to optical recording systems. It may equally be applied to magneto-optical recording systems or magnetic recording systems where address codes have been recorded in the track by means of a previously applied track modulation.

Finally it is remarked that although he invention has been described with reference to preferred embodiments thereof, it is to be understood that these are not limitative examples. Thus, various modifications thereof may become apparent to those skilled in the art, without departing from the scope of the invention, as defined by the claims. For instance a CD-RW may be replaced with a DVD-RW or the like.

The invention may be implemented by means of both hardware and software, and that several "means" may be represented by the same item of hardware. Further, the invention lies in each and every novel feature or combination of features. It is also remarked that the word "comprising" does not exclude the presence of other elements or steps than those listed in a claim. Any reference signs do not limit the scope of the claims.

The invention claimed is:

1. A record carrier of the disc-like optically inscribable type, having a preformed track in which an auxiliary signal comprising a sequence of codes is formed by a preformed track modulation, wherein the sequence of codes comprises a sequence of address codes specifying addresses of track portions in which said address codes are recorded and a plurality of special codes for specifying control data for controlling a recording by a recording device, wherein the preformed track consecutively from an inner part of the record carrier comprises:

program calibration area reserved for recorder calibrating purposes;

a program memory area for temporarily storing recorded user content data;

a lead-in area for storing definitive recorded user content data;

a program area for recording user data;

a lead-out area for indicating end of the program area;

wherein said special codes are recorded in the lead-in area and/or the lead-out area; and an extended area preceding the program calibration area containing special codes representing additional control information that are capable of controlling the recording device;

wherein the special codes contain bit combinations which do not occur in the address codes and are indicative of commands for controlling the recording device.

2. The record carrier of claim 1, wherein the extended area comprises an extended information area comprising the additional control information and a buffer area located between the extended information area and the program calibration area containing only address codes.

3. The record carrier of claim 2, wherein the address codes are represented by an absolute playback time relative to the start of the lead-in area, characterized in that, the buffer area covers a range of absolute playback time of between 1 and 2 seconds.

4. The record carrier of claim 2, wherein the address codes are represented by an absolute playback time relative to the start of the lead-in area, characterized in that, the extended information area precedes the start of the lead-in area by approximately 1 minute absolute playback time.

5. The record carrier of claim 1, wherein the sequence of address codes and special codes comprise a periodic pattern of address codes and special codes such that the pattern in the lead-in area has a predetermined positional relationship with respect to a predetermined reference address.

6. The record carrier according to claim 5, wherein the predetermined reference address is the start address or end address of the lead-in area.

7. A device for recording to and/or playback of a record carrier of the inscribable type as claimed in claim 5 comprising:

a reading mechanism configured to read information recorded on the record carrier, and a recording mechanism configured to record on the record carrier in accordance with a recording process, the reading mechanism comprising means to read the auxiliary signal recorded on the record carrier, selecting means for extracting the special codes and the address codes from the auxiliary signal, a control device that is configured to control recording and adapted to determine the predetermined positional relationship of the periodic pattern of address codes and special codes and to read the extended area on the record carries upon detecting the predetermined positional relationship.

8. A record carrier of the disc-like optically inscribable type, having a preformed track in which an auxiliary signal comprising a sequence of codes is formed by a preformed track modulation, which codes comprise a sequence of address codes specifying the addresses of the track portions in which said address codes are recorded and special codes for specifying control data for controlling a recording by a recording device, comprising:
- the preformed track comprises consecutively from an inner part of the record carrier;
- a program calibration area reserved for recorder calibrating purposes,
- a program memory area for temporarily storing recorded user content data,
- a lead-in area for storing definitive recorded user content data,
- a program area for recording user data, and
- a lead-out area for indicating end of the program area; and
- an extended area preceding the program calibration area containing special codes representing additional control information that are capable of controlling a player/recorder device;
- wherein the special codes contain bit combinations which do not occur in the address codes and are indicative of commands for controlling the recording device.

9. The record carrier of claim 8 wherein the extended area further comprises an extended information area comprising the additional control information; and a buffer area located between the extended information area and the program calibration area continuing only address codes.

10. The record carrier of claim 9, wherein the address codes are represented by an absolute playback time relative to the start of the lead-in area, characterized in that, the buffer area covers a range of absolute playback time.

11. The record carrier according to claim 9, wherein the address codes are represented by an absolute playback time relative to the start of the lead-in area, characterized in that, the extended information area precedes the start of the lead-in area by a predetermined amount of time that controls displacement of the recording device.

12. The record carrier according to claim 8, wherein the sequence of address codes and special codes comprise a periodic pattern of address codes and special codes within the lead-in area that has a predetermined positional relationship with respect to a predetermined reference address.

13. The record carrier according to claim 12, wherein the periodic pattern comprising special codes separated by a first number of successive address codes such that the periodic pattern is shifted by a predetermined number of address codes with respect to the predetermined reference address.

14. A device for recording to and/or playback of a record carrier of the inscribable type as claimed in claim 12, the device comprising:
- reading means for the reading the information recorded on the record carrier, and
- recording means for recording the record carrier in accordance with a recording process, the reading means comprising means to read the auxiliary signal recorded on the record carrier, selecting means for extracting the special codes and the address codes from the auxiliary signal,
- control means for controlling the recording process, characterized in that, the control means are adapted to determine the predetermined positional relationship of the periodic pattern of address codes and special codes and to read the extended area on the record carrier upon detecting the predetermined positional relationship.

15. Device according to claim 14, characterized in that, the control means are adapted to initially read the special information in the lead-in area and, only upon detection of the predetermined positional relationship, subsequently the lead-out area.

16. The device according to claim 14, characterized in that a plurality of most significant bits in the special codes contain bit combinations which do not occur in the address codes.

17. An optical record carrier comprising:
- a preformed track including auxiliary signal comprising a sequence of codes, the sequence of codes comprising a sequence of address codes and a plurality of special codes, the sequence of codes specifying addresses of track portions in which the sequence of address codes are recorded, and the plurality of special codes specifying control data for controlling a recording of the optical record carrier, wherein the preformed track consecutively from an inner part of the optical record carrier comprises:
- program calibration area reserved for recorder calibrating purposes;
- a program memory area for temporarily storing recorded user content data;
- a lead-in area for storing definitive recorded user content data;
- a program area for recording user data;
- a lead-out area for indicating end of the program area;
wherein said special codes are recorded in at least one of the lead-in area and the lead-out area; and
- an extended area preceding the program calibration area containing special codes representing additional control information that are capable of controlling at least one of playing and recording of the optical record carrier by a device;
- wherein the special codes contain bit combinations which do not occur in the address codes and are indicative of commands for controlling the device.

18. The optical record carrier of claim 17, wherein the extended area comprises an extended information area comprising the additional control information, and a buffer area located between the extended information area and the program calibration area containing only address codes.

19. The optical record carrier of claim 18, wherein the address codes are represented by an absolute playback time relative to a start of the lead-in area, and wherein the buffer area covers a range of absolute playback time.

20. The optical record carrier of claim 18, wherein the address codes are represented by an absolute playback time relative to a start of the lead-in area, and wherein the extended information area precedes the start of the lead-in area by a predetermined amount of time that controls displacement of the device.

21. The optical record carrier of claim 17, wherein a plurality of most significant bits in the special codes contain bit combinations which do not occur in the address codes.

22. A device for at least one of recording to and playback of an optical record carrier comprising:
- a reader configured to read information recorded on the optical record carrier including reading an auxiliary signal recorded on the record carrier and extracting special codes and address codes from the auxiliary signal;
- a recorder configured to record on the optical record carrier in accordance with a recording process; and
- a controller configured to control the recording process, to determine a predetermined positional relationship of a periodic pattern of address codes and special codes, and to read an extended area on the optical record carrier upon detecting the predetermined positional relationship;
- wherein the extended area precedes a program calibration area containing the special codes representing additional control information that are capable of controlling at least one of playing and recording of the optical record carrier by the device; and wherein the special codes contain bit combinations which do not occur in the address codes and are indicative of commands for controlling the device.

23. The device of claim 22, wherein the extended area comprises an extended information area comprising the additional control information, and a buffer area located between the extended information area and the program calibration area containing only address codes.

24. The device of claim 23, wherein the address codes are represented by an absolute playback time relative to a start of the lead-in area, and wherein the buffer area covers a range of absolute playback time.

25. The device of claim 23, wherein the address codes are represented by an absolute playback time relative to a start of the lead-in area, and wherein the extended information area precedes the start of the lead-in area by a predetermined amount of time that controls displacement of the device.

26. The device of claim 22, wherein a plurality of most significant bits in the special codes contain bit combinations which do not occur in the address codes.

* * * * *